(12) United States Patent
Honda et al.

(10) Patent No.: US 7,675,734 B2
(45) Date of Patent: Mar. 9, 2010

(54) ELECTROLYTIC SOLUTION AND ELECTROLYTIC CAPACITOR USING THE SAME

(75) Inventors: Kazumitsu Honda, Osaka (JP); Keiko Yamaga, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/366,311

(22) Filed: Feb. 5, 2009

(65) Prior Publication Data

US 2009/0147443 A1 Jun. 11, 2009

Related U.S. Application Data

(63) Continuation of application No. PCT/JP2007/067254, filed on Sep. 5, 2007.

(30) Foreign Application Priority Data

Sep. 7, 2006 (JP) .............................. 2006-242447

(51) Int. Cl.
*H01G 9/02* (2006.01)
*H01M 6/04* (2006.01)

(52) U.S. Cl. .................................... 361/504; 252/62.2

(58) Field of Classification Search ................. 361/503, 361/504–505; 252/62.2
See application file for complete search history.

(56) References Cited

U.S. PATENT DOCUMENTS 4,715,976 A 12/1987 Mori et al.
7,072,173 B2 * 7/2006 Takeda et al. ............... 361/523

2003/0152838 A1 * 8/2003 Takeda et al. ............... 429/329
2004/0095708 A1 * 5/2004 Takeda et al. ............... 361/504

FOREIGN PATENT DOCUMENTS

JP 2001-297947 A 10/2001
JP 2005-019671 A 1/2005
WO 95/15572 A1 6/1995

OTHER PUBLICATIONS

International Search Report for PCT/JP2007/067254.

* cited by examiner

*Primary Examiner*—Eric Thomas
(74) *Attorney, Agent, or Firm*—Pearne & Gordon LLP

(57) ABSTRACT

An electrolytic solution for an electrolytic capacitor includes an organic solvent, an additive dissolved in the organic solvent, and an electrolyte. The additive is made of at least one of borates represented by one of formula (1), formula (2), and formula (3). The electrolyte is phthalic acid 1,2,3,4-tetramethylimidazolynium.

$$CH_3(H)-[(R1)_l-O-B(OH)-O]_k-H \quad \text{formula (1)}$$

$$CH_3(H)-[(R1)_l-O-B(OH)-O-(R2)_n]_k-CH_3(H) \quad \text{formula (2)}$$

$$CH_3(H)-[(R1)_l-O-\underset{\underset{CH_3(H)}{|}}{\overset{\underset{O-(R2)_m}{|}}{B}}-O-(R3)_n]_k-CH_3(H) \quad \text{formula (3)}$$

Here the terminal is $CH_3$ or H, each of R1, R2, and R3 is one of $-CH_2O-$, $-C_2H_4O-$, $-C_3H_6O-$, and $-C_4H_8O-$, and each of k, l, m, and n is any natural number.

5 Claims, 1 Drawing Sheet

ELECTROLYTIC SOLUTION AND ELECTROLYTIC CAPACITOR USING THE SAME

BACKGROUND OF THE INVENTION

1. Field of the Invention

The present invention relates to an electrolytic solution for an electrolytic capacitor, and an electrolytic capacitor using it.

2. Background Art

Electrolytic solution used for an electrolytic capacitor generally contains, as a main solvent, an organic compound such as γ-butyrolactone or ethylene glycol. As an electrolyte, ammonium salt or the like of carboxylic acid represented by maleic acid or citraconic acid is used. Alternatively, carboxylate of quaternized product of a compound containing alkyl-substituted amidine group is used as the electrolyte.

Recently, solder has been put into a lead-free state in order to reduce the amount of environmental burden material used. For responding to the lead-free solder, the temperature in a reflow process has to be increased to 260° C. In an electrolytic capacitor using the conventional electrolytic solution as discussed above, the heat in a solder reflow furnace whose temperature increases to 260° C., for example, vaporizes a small amount of moisture in the capacitor and increases the internal pressure in the capacitor. When the internal pressure is thus increased, a sealing material of the capacitor deforms and a mounting failure can occur.

SUMMARY OF THE INVENTION

An electrolytic solution for the electrolytic capacitor of the invention includes an organic solvent, an additive dissolved in the organic solvent, and an electrolyte. The additive is made of at least one of borates represented by one of formula (1), formula (2), and formula (3). The electrolyte is phthalic acid 1,2,3,4-tetramethylimidazolynium.

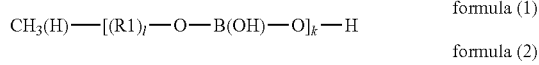
formula (1)
formula (2)

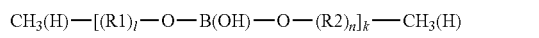
formula (3)

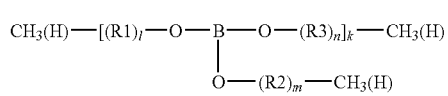

Here, the terminal may be $CH_3$ or H. Each of R1, R2, and R3 is one of $-CH_2O-$, $-C_2H_4O-$, $-C_3H_6O-$, and $-C_4H_8O-$. Each of k, l, m, and n is any natural number.

In this composition, the moisture in the electrolytic capacitor is absorbed by hydrolysis of borate, and the increase in internal pressure due to vaporization of the moisture in the electrolytic capacitor is suppressed. The vapor pressure of the salt made of onium cation and anion of polyvalent carboxylic acid is extremely low, so that the vaporization of the electrolytic solution at high temperature can be suppressed. Thanks to these effects, the electrolytic capacitor does not undergo the mounting failure even in the reflow process of high temperature, and the characteristic thereof becomes stable.

DETAILED DESCRIPTION OF THE INVENTION

Figure 1:
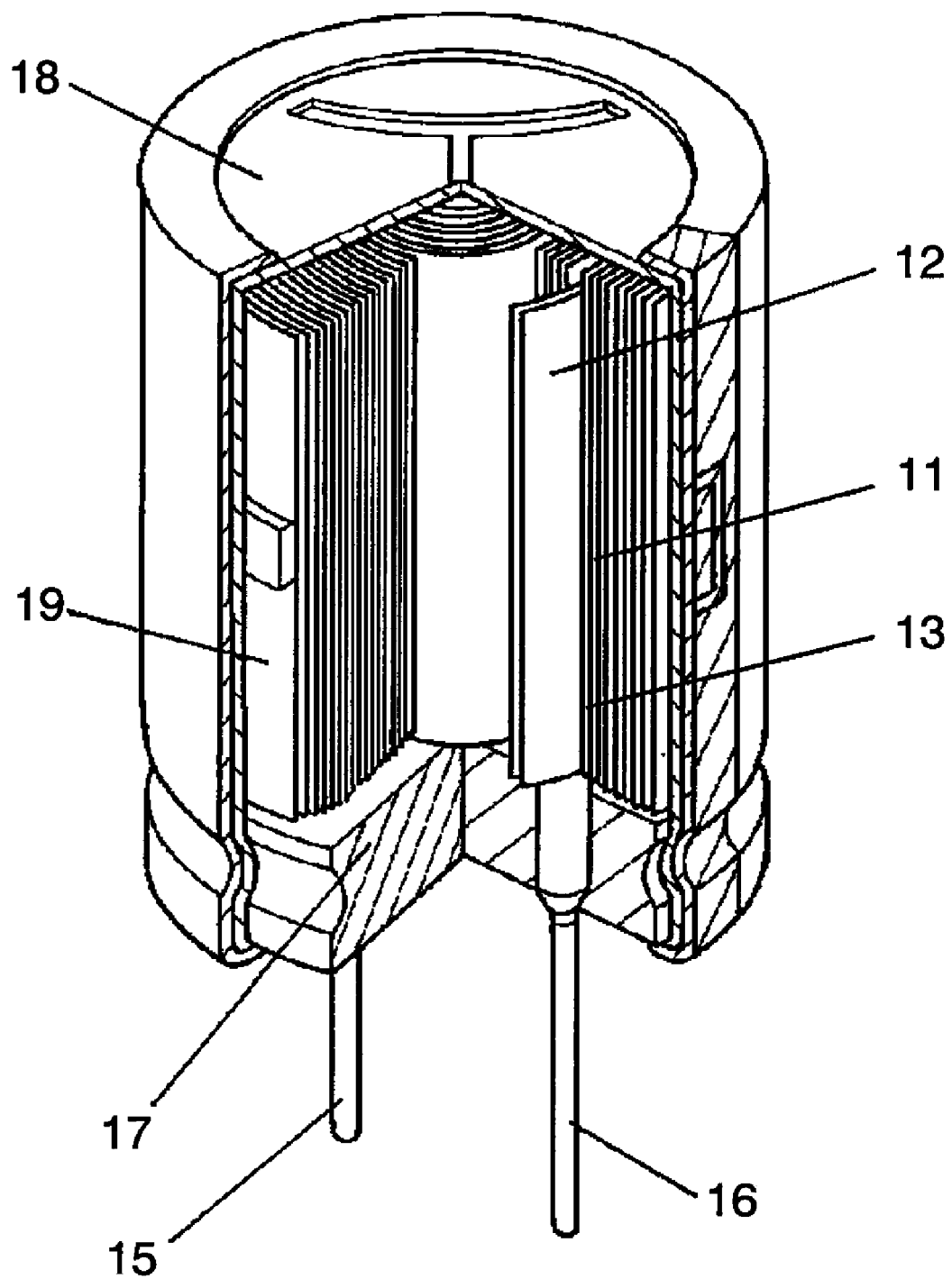
FIG. 1 is a partially cutaway perspective view showing a structure of an electrolytic capacitor in accordance with an exemplary embodiment of the present invention.

FIG. 1 is a partially cutaway perspective view showing a structure of an electrolytic capacitor in accordance with an exemplary embodiment of the present invention. This electrolytic capacitor has capacitor element 19, metal case 18, and sealing material 17.

Capacitor element 19 is formed of positive electrode 11, negative electrode 12, and separator 13 interposed between them. Positive electrode 11 and negative electrode 12 are made of aluminum foil, for example. In other words, this electrolytic capacitor is an aluminum electrolytic capacitor. Separator 13 is made of paper, woven fabric, or non-woven fabric. Positive electrode 11 and negative electrode 12 are wound so that they face each other through separator 13. Positive electrode lead 15 is connected to positive electrode 11, and negative electrode lead 16 is connected to negative electrode 12. Capacitor element 19 is impregnated with an electrolytic solution (not shown).

Case 18 is made of aluminum, for example, and sealing material 17 is made of rubber or phenol resin. Case 18 stores capacitor element 19 impregnated with the electrolytic solution, and sealing material 17 is disposed in an opening of case 18 and seals capacitor element 19.

The solvent of the electrolytic solution is an organic solvent. In the organic solvent, an additive made of at least one of borates represented by formula (1), formula (2) and formula (3) is dissolved, and salt made of onium cation and anion of polyvalent carboxylic acid is dissolved as an electrolyte.

formula (1)

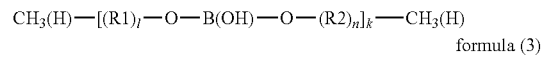
formula (2)
formula (3)

Here, the terminal may be $CH_3$ or H. Each of R1, R2, and R3 is one of $-CH_2O-$, $-C_2H_4O-$, $-C_3H_6O-$, and $-C_4H_8O-$. Each of k, l, m, and n is any natural number.

In this composition, the moisture in the electrolytic capacitor is absorbed by hydrolysis of borate, and the increase in internal pressure due to vaporization of the moisture in the electrolytic capacitor is suppressed. The vapor pressure of the salt made of onium cation and anion of polyvalent carboxylic acid is extremely low, so that the vaporization of the electrolytic solution at high temperature can be suppressed.

As the onium cation, quaternary ammonium cation, amidinium cation, guanidinium cation can be used. From the viewpoint of decomposition temperature, amidinium cation and guanidinium cation are preferable, and cyclic amidinium cation and cyclic guanidinium cation are more preferable. Cyclic amidinium cation and cyclic guanidinium cation of five-membered ring and six-membered ring are especially preferable.

Examples of amidinium cation are listed as follows.

[1] Imidazolynium group 1,2,3,4-tetramethylimidazolynium, 1,3,4-trimethyl-2-ethylimidazolynium, 1,3-dimethyl-2,4-diethylimidazolynium, 1,2-dimethyl-3,4-diethylimidazolynium, 1-methyl-2,3,4-triethylimidazolynium, 1,2,3,4-tetraethylimidazolynium, 1,2,3-trimethylimidazolynium, 1,3-dimethyl-2-ethylimidazolynium, 1-ethyl-2,3-dimethylimidazolynium, 1,2,3-triethylimidazolynium, 4-cyano-1,2,3-trimethylimidazolynium, 3-cyanomethyl-1,2-dimethylimidazolynium, 2-cyanomethyl-1,3-dimethylimidazolynium, 4-acetyl-1,2,3-trimethylimidazolynium, 3-acetylmethyl-1,2-dimethylimidazolynium, 4-methylcarboxymethyl-1,2,3-trimethylimidazolynium, 3-methylcarboxymethyl-1,2-dimethylimidazolynium, 4-methoxy-1,2,3-trimethylimidazolynium, 3-methoxymethyl-1,2-dimethylimidazolynium, 4-formyl-1,2,3-trimethylimidazolynium, 3-formylmethyl-1,2-dimethylimidazolynium, 3-hydroxyethyl-1,2-dimethylimidazolynium, 4-hydroxymethyl-1,2,3-trimethylimidazolynium, and 2-hydroxyethyl-1,3-dimethylimidazolynium.

[2] Imidazolium group 1,3-dimethylimidazolium, 1,3-diethylimidazolium, 1-ethyl-3-methylimidazolium, 1,2,3-trimethylimidazolium, 1,2,3,4-tetramethylimidazolium, 1,3-dimethyl-2-ethylimidazolium, 1,2-dimethyl-3-ethylimidazolium, 1,2,3-triethylimidazolium, 1,2,3,4-tetraethylimidazolium, 1,3-dimethyl-2-phenylimidazolium, 1,3-dimethyl-2-benzylimidazolium, 1-benzyl-2,3-dimethylimidazolium, 4-cyano-1,2,3-trimethylimidazolium, 3-cyanomethyl-1,2-dimethylimidazolium, 2-cyanomethyl-1,3-dimethylimidazolium, 4-acetyl-1,2,3-trimethylimidazolium, 3-acetylmethyl-1,2-dimethylimidazolium, 4-methylcarboxymethyl-1,2,3-trimethylimidazolium, 3-methylcarboxymethyl-1,2-dimethylimidazolium, 4-methoxy-1,2,3-trimethylimidazolynium, 3-methoxymethyl-1,2-dimethylimidazolium, 4-formyl-1,2,3-trimethylimidazolium, 3-formylmethyl-1,2-dimethylimidazolium, 3-hydroxyethyl-1,2-dimethylimidazolium, 4-hydroxymethyl-1,2,3-trimethylimidazolium, and 2-hydroxyethyl-1,3-dimethylimidazolium.

[3] Tetrahydropyrimidinium group 1,3-dimethyl-1,4,5,6-tetrahydropyrimidinium, 1,2,3-trimethyl-1,4,5,6-tetrahydropyrimidinium, 1,2,3,4-tetramethyl-1,4,5,6-tetrahydropyrimidinium, 1,2,3,5-tetramethyl-1,4,5,6-tetrahydropyrimidinium, 8-methyl-1,8-diazabicyclo[5,4,0]-7-undecenium, 5-methyl-1,5-diazabicyclo[4,3,0]-5-nonenium, 4-cyano-1,2,3-trimethyl-1,4,5,6-tetrahydropyrimidinium, 3-cyanomethyl-1,2-dimethyl-1,4,5,6-tetrahydropyrimidinium, 2-cyanomethyl-1,3-dimethyl-1,4,5,6-tetrahydropyrimidinium, 4-acetyl-1,2,3-trimethyl-1,4,5,6-tetrahydropyrimidinium, 3-acetylmethyl-1,2-dimethyl-1,4,5,6-tetrahydropyrimidinium, 4-methylcarboxymethyl-1,2,3-trimethyl-1,4,5,6-tetrahydropyrimidinium, 3-methylcarboxymethyl-1,2-dimethyl-1,4,5,6-tetrahydropyrimidinium, 4-methoxy-1,2,3-trimethyl-1,4,5,6-tetrahydropyrimidinium, 3-methoxymethyl-1,2-dimethyl-1,4,5,6-tetrahydropyrimidinium, 4-formyl-1,2,3-trimethyl-1,4,5,6-tetrahydropyrimidinium, 3-formylmethyl-1,2-dimethyl-1,4,5,6-tetrahydropyrimidinium, 3-hydroxyethyl-1,2-dimethyl-1,4,5,6-tetrahydropyrimidinium, 4-hydroxymethyl-1,2,3-trimethyl-1,4,5,6-tetrahydropyrimidinium, and 2-hydroxyethyl-1,3-dimethyl-1,4,5,6-tetrahydropyrimidinium.

[4] Dihydropyrimidinium group 1,3-dimethyl-1,4-dihydropyrimidinium, 1,3-dimethyl-1,6-dihydropyrimidinium (they are collectively represented by 1,3-dimethyl-1,4(6)-dihydropyrimidinium, and similar representation is used hereinafter), 1,2,3-trimethyl-1,4(6)-dihydropyrimidinium, 1,2,3,4-tetramethyl-1,4(6)-dihydropyrimidinium, 1,2,3,5-tetramethyl-1,4(6)-dihydropyrimidinium, 8-methyl-1,8-diazabicyclo[5,4,0]-7,9(10)-undecadienium, 5-methyl-1,5-diazabicyclo[4,3,0]-5,7(8)-nonadienium, 4-cyano-1,2,3-trimethyl-1,4(6)-dihydropyrimidinium, 3-cyanomethyl-1,2-dimethyl-1,4(6)-dihydropyrimidinium, 2-cyanomethyl-1,3-dimethyl-1,4(6)-dihydropyrimidinium, 4-acetyl-1,2,3-trimethyl-1,4(6)-dihydropyrimidinium, 3-acetylmethyl-1,2-dimethyl-1,4(6)-dihydropyrimidinium, 4-methylcarboxymethyl-1,2,3-trimethyl-1,4(6)-dihydropyrimidinium, 3-methylcarboxymethyl-1,2-dimethyl-1,4(6)-dihydropyrimidinium, 4-methoxy-1,2,3-trimethyl-1,4(6)-dihydropyrimidinium, 3-methoxymethyl-1,2-dimethyl-1,4(6)-dihydropyrimidinium, 4-formyl-1,2,3-trimethyl-1,4(6)-dihydropyrimidinium, 3-formylmethyl-1,2-dimethyl-1,4(6)-dihydropyrimidinium, 3-hydroxyethyl-1,2-dimethyl-1,4(6)-dihydropyrimidinium, 4-hydroxymethyl-1,2,3-trimethyl-1,4(6)-dihydropyrimidinium, and 2-hydroxyethyl-1,3-dimethyl-1,4(6)-dihydropyrimidinium.

Examples of cation are listed as follows.

[1] Guanidinium group having imidazolynium skeleton 2-dimethylamino-1,3,4-trimethylimidazolynium, 2-diethylamino-1,3,4-trimethylimidazolynium, 2-diethylamino-1,3-dimethyl-4-ethylimidazolynium, 2-dimethylamino-1-methyl-3,4-diethylimidazolynium, 2-diethylamino-1-methyl-3,4-diethylimidazolynium, 2-diethylamino-1,3,4-triethylimidazolynium, 2-dimethylamino-1,3-dimethylimidazolynium, 2-diethylamino-1,3-dimethylimidazolynium, 2-dimethylamino-1-ethyl-3-methylimidazolynium, 2-diethylamino-1,3-diethylimidazolynium, 1,5,6,7-tetrahydro-1,2-dimethyl-2H-imido[1,2a]imidazolynium, 1,5-dihydro-1,2-dimethyl-2H-imido[1,2a]imidazolynium, 1,5,6,7-tetrahydro-1,2-dimethyl-2H-pyrimido[1,2a]imidazolynium, 1,5-dihydro-1,2-dimethyl-2H-pyrimido[1,2a]imidazolynium, 2-dimethylamino-4-cyano-1,3-dimethylimidazolynium, 2-dimethylamino-3-cyanomethyl-1-methylimidazolynium, 2-dimethylamino-4-acetyl-1,3-dimethylimidazolynium, 2-dimethylamino-3-acetylmethyl-1-methylimidazolynium, 2-dimethylamino-4-methylcarboxymethyl-1,3-dimethylimidazolynium, 2-dimethylamino-3-methylcarboxymethyl-1-methylimidazolynium, 2-dimethylamino-4-methoxy-1,3-dimethylimidazolynium, 2-dimethylamino-3-methoxymethyl-1-methylimidazolynium, 2-dimethylamino-4-formyl-1,3-dimethylimidazolynium, 2-dimethylamino-3-formylmethyl-1-methylimidazolynium, 2-dimethylamino-3-hydroxyethyl-1-methylimidazolynium, and 2-dimethylamino-4-hydroxymethyl-1,3-dimethylimidazolynium.

[2] Guanidinium group having imidazolium skeleton 2-dimethylamino-1,3,4-trimethylimidazolium, 2-diethylamino-1,3,4-trimethylimidazolium, 2-diethylamino-1,3-dimethyl-4-ethylimidazolium, 2-dimethylamino-1-methyl-3,4-diethylimidazolium, 2-diethylamino-1-methyl-3,4-diethylimidazolium, 2-diethylamino-1,3,4-triethylimidazolium, 2-dimethylamino-1,3-dimethylimidazolium, 2-diethylamino-1,3-dimethylimidazolium, 2-dimethylamino-1-ethyl-3-methylimidazolium, 2-diethylamino-1,3-diethylimidazolium, 1,5,6,7-tetrahydro-1,2-dimethyl-2H-imido[1,2a]imidazolium, 1,5-dihydro-1,2-dimethyl-2H-imido[1,2a]imidazolium, 1,5,6,7-tetrahydro-1,2-dimethyl-2H-pyrimido[1,2a]imidazolium, 1,5-dihydro-1,2-dimethyl-2H-pyrimido[1,2a]imidazolium, 2-dimethylamino-4-cyano- 1,3-dimethylimidazolium, 2-dimethylamino-3-cyanomethyl-1-methylimidazolium, 2-dimethylamino-4-acetyl-1,3-dimethylimidazolium, 2-dimethylamino-3-acetylmethyl-1-methylimidazolium, 2-dimethylamino-4-methylcarboxymethyl-1,3-dimethylimidazolium, 2-dimethylamino-3-methylcarboxymethyl-1-methylimidazolium, 2-dimethylamino-4-methoxy-1,3-dimethylimidazolium, 2-dimethylamino-3-methoxymethyl-1-methylimidazolium, 2-dimethylamino-4-formyl-1,3-dimethylimidazolium, 2-dimethylamino-3-formylmethyl-1-methylimidazolium, 2-dimethylamino-3-hydroxyethyl-1-methylimidazolium, and 2-dimethylamino-4-hydroxymethyl-1,3-dimethylimidazolium.

[3] Guanidinium group having tetrahydropyrimidinium skeleton 2-dimethylamino-1,3,4-trimethyl-1,4,5,6-tetrahydropyrimidinium, 2-diethylamino-1,3,4-trimethyl-1,4,5,6-tetrahydropyrimidinium, 2-diethylamino-1,3-dimethyl-4-ethyl-1,4,5,6-tetrahydropyrimidinium, 2-dimethylamino-1-methyl-3,4-diethyl-1,4,5,6-tetrahydropyrimidinium, 2-diethylamino-1-methyl-3,4-diethyl-1,4,5,6-tetrahydropyrimidinium, 2-diethylamino-1,3,4-triethyl-1,4,5,6-tetrahydropyrimidinium, 2-dimethylamino-1,3-dimethyl-1,4,5,6-tetrahydropyrimidinium, 2-diethylamino-1,3-dimethyl-1,4,5,6-tetrahydropyrimidinium, 2-dimethylamino-1-ethyl-3-methyl-1,4,5,6-tetrahydropyrimidinium, 2-diethylamino-1,3-diethyl-1,4,5,6-tetrahydropyrimidinium, 1,3,4,6,7,8-hexahydro-1,2-dimethyl-2H-imido[1,2a]pyrimidinium, 1,3,4,6-tetrahydro-1,2-dimethyl-2H-imido[1,2a]pyrimidinium, 1,3,4,6,7,8-hexahydro-1,2-dimethyl-2H-pyrimido[1,2a]pyrimidinium, 1,3,4,6-tetrahydro-1,2-dimethyl-2H-pyrimido[1,2a]pyrimidinium, 2-dimethylamino-4-cyano-1,3-dimethyl-1,4,5,6-tetrahydropyrimidinium, 2-dimethylamino-3-cyanomethyl-1-methyl-1,4,5,6-tetrahydropyrimidinium, 2-dimethylamino-4-acetyl-1,3-dimethyl-1,4,5,6-tetrahydropyrimidinium, 2-dimethylamino-3-acetylmethyl-1-methyl-1,4,5,6-tetrahydropyrimidinium, 2-dimethylamino-4-methylcarboxymethyl-1,3-dimethyl-1,4,5,6-tetrahydropyrimidinium, 2-dimethylamino-3-methylcarboxymethyl-1-methyl-1,4,5,6-tetrahydropyrimidinium, 2-dimethylamino-4-methoxy-1,3-dimethyl-1,4,5,6-tetrahydropyrimidinium, 2-dimethylamino-3-methoxymethyl-1-methyl-1,4,5,6-tetrahydropyrimidinium, 2-dimethylamino-4-formyl-1,3-dimethyl-1,4,5,6-tetrahydropyrimidinium, 2-dimethylamino-3-formylmethyl-1-methyl-1,4,5,6-tetrahydropyrimidinium, 2-dimethylamino-3-hydroxyethyl-1-methyl-1,4,5,6-tetrahydropyrimidinium, and 2-dimethylamino-4-hydroxymethyl-1,3-dimethyl-1,4,5,6-tetrahydropyrimidinium.

[4] Guanidinium group having dihydropyrimidinium skeleton 2-dimethylamino-1,3,4-trimethyl-1,4(6)-dihydropyrimidinium, 2-diethylamino-1,3,4-trimethyl-1,4(6)-dihydropyrimidinium, 2-diethylamino-1,3-dimethyl-4-ethyl-1,4(6)-dihydropyrimidinium, 2-dimethylamino-1-methyl-3,4-diethyl-1,4(6)-dihydropyrimidinium, 2-diethylamino-1-methyl-3,4-diethyl-1,4(6)-dihydropyrimidinium, 2-diethylamino-1,3,4-triethyl-1,4(6)-dihydropyrimidinium, 2-dimethylamino-1,3-dimethyl-1,4(6)-dihydropyrimidinium, 2-diethylamino-1,3-dimethyl-1,4(6)-dihydropyrimidinium, 2-dimethylamino-1-ethyl-3-methyl-1,4(6)-dihydropyrimidinium, 2-diethylamino-1,3-diethyl-1,4(6)-dihydropyrimidinium, 1,6,7,8-tetrahydro-1,2-dimethyl-2H-imido[1,2a]pyrimidinium, 1,6-dihydro-1,2-dimethyl-2H-imido[1,2a]pyrimidinium, 1,6,7,8-tetrahydro-1,2-dimethyl-2H-pyrimido[1,2a]pyrimidinium, 1,6-dihydro-1,2-dimethyl-2H-pyrimido[1,2a]pyrimidinium, 2-dimethylamino-4-cyano-1,3-dimethyl-1,4(6)-dihydropyrimidinium, 2-dimethylamino-3-cyanomethyl-1-methyl-1,4(6)-dihydropyrimidinium, 2-dimethylamino-4-acetyl-1,3-dimethyl-1,4(6)-dihydropyrimidinium, 2-dimethylamino-3-acetylmethyl-1-methyl-1,4(6)-dihydropyrimidinium, 2-dimethylamino-4-methylcarboxymethyl-1,3-dimethyl-1,4(6)-dihydropyrimidinium, 2-dimethylamino-3-methylcarboxymethyl-1-methyl-1,4(6)-dihydropyrimidinium, 2-dimethylamino-4-methoxy-1,3-dimethyl-1,4(6)-dihydropyrimidinium, 2-dimethylamino-3-methoxymethyl-1-methyl-1,4(6)-dihydropyrimidinium, 2-dimethylamino-4-formyl-1,3-dimethyl-1,4(6)-dihydropyrimidinium, 2-dimethylamino-3-formylmethyl-1-methyl-1,4(6)-dihydropyrimidinium, 2-dimethylamino-3-hydroxyethyl-1-methyl-1,4(6)-dihydropyrimidinium, and 2-dimethylamino-4-hydroxymethyl-1,3-dimethyl-1,4(6)-dihydropyrimidinium One or more of amidinium and guanidinium may be used concomitantly. Of amidinium and guanidinium, amidinium is preferable. Imidazolynium group and imidazolium group are more preferable. The most preferable is 1-ethyl-3-methylimidazolium, 1,2,3,4-tetramethylimidazolynium, and 1-ethyl-2,3-dimethylimidazolynium.

Polyvalent carboxylic acid is a compound containing two or more carboxyl groups in one molecule. Examples of polyvalent carboxylic acid are listed as follows. They are oxalic acid, malonic acid, succinic acid, glutaric acid, adipic acid, pimelic acid, suberic acid, azelaic acid, sebacic acid, 1,6-decanoic dicarboxylic acid, 5,6-decanoic dicarboxylic acid, formic acid, acetic acid, propionic acid, butyric acid, isobutyric acid, valeric acid, caproic acid, enanthic acid, caprylic acid, pelargonic acid, lauryl acid, myristic acid, stearic acid, behenic acid, maleic acid, fumaric acid, itaconic acid, acrylic acid, methacrylic acid, oleic acid, phthalic acid, salicylic acid, isophthalic acid, terephthalic acid, trimellitic acid, pyromellitic acid, benzoic acid, resorcylic acid, cinnamic acid, and naphthoic acid. Among them, phthalic acid, maleic acid, salicylic acid, and benzoic acid are preferable. One or more of them may be used concomitantly.

The concentration of the salt made of onium cation and anion of polyvalent carboxylic acid is preferably in the range of 10 wt % to 50 wt %. When the concentration is lower than 10 wt %, the effect on reduction in vapor pressure is small, and the effect on suppression of the internal pressure in the reflow process is small. When the concentration exceeds 50 wt %, the characteristics of the electrolytic capacitor at low temperature is decreased.

The dissolved amount (content in electrolytic solution) of borates represented by formula (1) through formula (3) is preferably in the range of 1 wt % to 30 wt %. When the dissolved amount is less than 1 wt %, the effect of suppressing the vaporization of the moisture and increase in internal pressure cannot be produced. When the dissolved amount is more than 30 wt %, the capacitor characteristic is decreased. For example, the conductance of the electrolytic solution decreases, and equivalent series resistance (ESR) increases.

As the organic solvent, a solvent mainly containing γ-butyrolactone, sulfolane, or a mixed solvent of them can be used. In other words, in the organic solvent of the present embodiment, weight percent of γ-butyrolactone, sulfolane, or the mixed solvent of γ-butyrolactone and sulfolane is the largest. Using the each solvent or mixed solvent improves the reliability of the electrolytic capacitor and low-temperature characteristic.

The exemplary embodiment of the present invention is hereinafter described in detail using specific examples. First, compounds having the structures of formula (1) through formula (3) used in the exemplary embodiment of the present invention are shown in Table 1.

TABLE 1

| No. | R1 | R2 | R3 | Formula | Coefficient |
|---|---|---|---|---|---|
| 1 | $-C_2H_4O$ | — | — | (1) | Terminal: $-CH_3$, l = 3, k = 1 |
| 2 | $-C_2H_4O$ | — | — | (1) | Terminal: $-H$, l = 2, k = 1 |
| 3 | $-C_4H_8O$ | — | — | (1) | Terminal: $-H$, l = 2, k = 2 |
| 4 | $-C_2H_4O$ | $-C_2H_4O$ | — | (2) | Terminal: $-CH_3$ & $-H$, l = 3, n = 2, k = 1 |
| 5 | $-C_2H_4O$ | $-C_2H_4O$ | — | (2) | Terminal: $-CH_3$ & $-CH_3$, l = 3, n = 3, k = 1 |
| 6 | $-C_2H_4O$ | $-C_2H_4O$ | — | (2) | Terminal: $-H$ & $-H$, l = 2, n = 2, k = 1 |
| 7 | $-C_2H_4O$ | $-C_2H_4O$ | $-C_2H_4O$ | (3) | Terminal: $-CH_3$ & $-CH_3$, l = 3, n = 3, m = 3, k = 1 |
| 8 | $-C_2H_4O$ | $-C_2H_4O$ | $-C_2H_4O$ | (3) | Terminal: $-H$ & $-H$, l = 2, n = 2, m = 2, k = 1 |
| 9 | $-C_2H_4O$ | $-C_3H_6O$ | $-C_2H_4O$ | (3) | Terminal: $-H$ & $-H$, l = 2, n = 2, m = 2, k = 1 |

As shown in Table 1, in the borates represented by formula (1) through formula (3), their substituent groups can be selected as any forms. Therefore, physical characteristics such as viscosity or melting point can be freely selected in response to the application of the electrolytic solution. The borates can be applied to the electrolytic solution in any voltage range. In a preparing process of the electrolytic solution, the composition can be easily selected. The structural formulas shown in Table 1 are examples of the structures represented by formula (1) through formula (3). A structure other than the structures in Table 1 can be employed.

Next, the compositions of the electrolytic solutions used in specific examples of the present embodiment are shown in Table 2. Each number (No.) in the column of component material corresponds to the material shown by the same number in Table 1. Table 2 also shows compositions of the electrolytic solutions in the comparative examples used for comparison with the specific examples. The moistures in the electrolytic solutions are adjusted to 2%.

TABLE 2

| | Component material | Composition (wt %) | Conductivity (mS/cm) | Spark occurrence voltage (V) |
|---|---|---|---|---|
| Example 1 | GBL | 70 | 9.2 | 62 |
| | TMIP | 20 | | |
| | No. 1 | 10 | | |
| Example 2 | GBL | 50 | 6.1 | 70 |
| | TMIP | 30 | | |
| | No. 4 | 20 | | |
| Example 3 | GBL | 70 | 5.5 | 70 |
| | TMIP | 10 | | |
| | No. 4 | 20 | | |
| Example 4 | GBL | 55 | 9.0 | 75 |
| | TMIP | 30 | | |
| | No. 1, 2, 4 | 15 | | |
| Example 5 | GBL | 45 | 12.2 | 65 |
| | TMIP | 50 | | |
| | No. 1, 4, 7 | 5 | | |
| Example 6 | GBL | 55 | 8.4 | 65 |
| | TMIP | 35 | | |
| | No. 3, 5, 8 | 10 | | |
| Example 7 | GBL | 49 | 6.2 | 70 |
| | SL | 25 | | |
| | TMIP | 25 | | |
| | No. 4 | 1 | | |
| Example 8 | GBL | 20 | 4.5 | 75 |
| | SL | 30 | | |
| | TMIP | 20 | | |
| | No. 1, 2, 4 | 30 | | |
| Comparative example 1 | GBL | 90 | 7.1 | 90 |
| | phthalic acid triethylamine | 10 | | |
| Comparative example 2 | GBL | 80 | 11.0 | 60 |
| | TMIP | 20 | | |

GBL: γ-butyrolactone
TMIP: phthalic acid 1,2,3,4-tetramethylimidazolynium
SL: sulfolane Aluminum electrolytic capacitors are produced using electrolytic solutions of examples 1 through 8 and those of comparative examples 1 and 2. The diameter of the electrolytic capacitors is 6.3 mm, the length is 5.8 mm, the rated voltage is 6.3 V, the capacitance is 220 μF. As sealing material 17, resin-vulcanized butyl rubber is used.

The heat resistances of the each aluminum electrolytic capacitors thus produced are evaluated. The number of tested capacitors is 10 in each test. At first, the shape variation related to the mounting property is evaluated by reflow. In other words, the upper limit temperature during reflow is assumed to be 260° C., and the reflow is performed at 230° C. for 30 seconds and at 200° C. for 70 seconds. This reflow is performed twice. Table 3 shows swelling of sealing material 17 after the test.

TABLE 3

| | Swelling of sealing material after reflow(mm) |
|---|---|
| Example 1 | 0.07 |
| Example 2 | 0.08 |
| Example 3 | 0.09 |
| Example 4 | 0.09 |
| Example 5 | 0.10 |
| Example 6 | 0.11 |
| Example 7 | 0.12 |
| Example 8 | 0.07 |
| Comparative example 1 | 0.45 |
| Comparative example 2 | 0.39 |

As is clear from Table 3, the swelling of sealing material 17 in the aluminum electrolytic capacitors of examples 1 through 8 is extremely smaller than that in the aluminum electrolytic capacitors of comparative examples 1 and 2.

Next, the capacitor characteristic, variation in weight, and existence of liquid leakage are evaluated. The aluminum electrolytic capacitors of examples 1 through 8 and comparative examples 1 and 2 are left at 105° C., and, after a lapse of 2,000 hours, variation rate (ΔC) of the capacitance, the tangent (tan δ) of the loss angle, and leakage current (LC) are measured. Variation (ΔW) in weight is also measured. ΔW shows the dry up property of the electrolytic solution. Table 4 shows the measurement results.

TABLE 4

|  | ΔC (%) | Tanδ (%) | LC (µA) | ΔW (mg) |
|---|---|---|---|---|
| Example 1 | −18 | 22 | 1.2 | 8.0 |
| Example 2 | −19 | 20 | 1.4 | 9.1 |
| Example 3 | −18 | 21 | 1.3 | 8.9 |
| Example 4 | −17 | 23 | 1.5 | 9.0 |
| Example 5 | −15 | 22 | 1.4 | 8.7 |
| Example 6 | −16 | 21 | 1.4 | 8.9 |
| Example 7 | −19 | 22 | 1.5 | 9.1 |
| Example 8 | −15 | 20 | 1.4 | 7.9 |
| Comparative example 1 | −24 | 26 | 1.5 | 9.8 |
| Comparative example 2 | −22 | 25 | 1.5 | 9.4 |

As is clear from Table 4, all characteristics of the aluminum electrolytic capacitors of examples 1 through 8 are good even after a lapse of 2000 hours, and are equivalent to or higher than those of comparative examples 1 and 2.

As one more liquid leakage test, the rated voltage is applied in a high-temperature and high-humidity environment of 85° C. and 85% RH, and the state of sealing material 17 after a lapse of 2000 hours is observed. As a result, liquid leakage is observed in neither the aluminum electrolytic capacitors of examples 1 through 8 nor the aluminum electrolytic capacitors of comparative examples 1 and 2, and the liquid leakage resistance of examples 1 through 8 is equivalent to or higher than that of comparative examples 1 and 2.

Thus, using the electrolytic solution of the present embodiment suppresses the swelling of sealing material 17 during the reflow, and allows an aluminum electrolytic capacitor of high reliability to be formed.

An aluminum electrolytic capacitor has been described as an example in the present embodiment; however, the present invention may be applied to an electrolytic capacitor where valve metal such as tantalum or niobium is used as an electrode. In this case, the valve metal is required to be used as at least positive electrode 11.

As described above, an electrolytic solution of the present invention can be applied to an electrolytic capacitor, and allows forming of an aluminum electrolytic capacitor that has high reliability and is stable for a long time especially at high temperature. Therefore, the electrolytic capacitor can be mounted in a reflow process using a lead-free solder. Thus, the performance of the electrolytic capacitor can be increased, so that the industrial applicability is high.

What is claimed is:

1. An electrolytic solution for an electrolytic capacitor consisting of:
    an organic solvent;
    an additive dissolved in the organic solvent and made of at least one of borates represented by one of formula (1), formula (2), and formula (3); and
    phthalic acid 1,2,3,4-tetramethylimidazolynium dissolved in the organic solvent as an electrolyte,

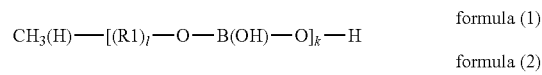

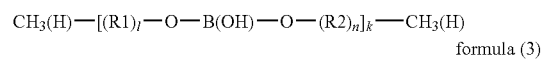

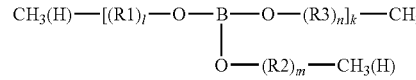

wherein a terminal is $CH_3$ or H, each of R1, R2, and R3 is one of $-CH_2O-$, $-C_2H_4O-$, $-C_3H_6O-$, and $-C_4H_8O-$, and each of k, l, m, and n is any natural number.

2. The electrolytic solution according to claim 1, wherein content of the additive in the electrolytic solution is between 1 wt % and 30 wt % inclusive.

3. The electrolytic solution according to claim 1, wherein weight percent of a mixed solvent of γ-butyrolactone and sulfolane is the largest in the organic solvent.

4. The electrolytic solution according to claim 1, wherein weight percent of γ-butyrolactone is the largest in the organic solvent.

5. An electrolytic capacitor comprising:
    a capacitor element having:
        a positive electrode;
        a negative electrode; and
        a separator interposed between the positive electrode and the negative electrode;
    an electrolytic solution impregnated in the capacitor element, the electrolytic solution consisting of:
        an organic solvent;
        an additive dissolved in the organic solvent and made of at least one of borates represented by one of formula (1), formula (2), and formula (3); and
        phthalic acid 1,2,3,4-tetramethylimidazolynium dissolved in the organic solvent as an electrolyte,

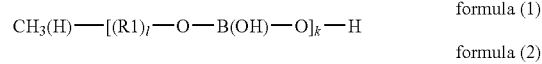

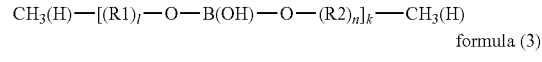

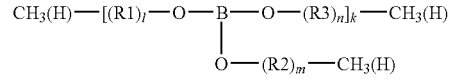

wherein a terminal is $CH_3$ or H, each of R1, R2, and R3 is one of $-CH_2O-$, $-C_2H_4O-$, $-C_3H_6O-$, and $-C_4H_8O-$, and each of k, l, m, and n is any natural number.

* * * * *